United States Patent
Ishikawa (10) Patent No.: US 6,175,796 B1
(45) Date of Patent: *Jan. 16, 2001

(54) APPARATUS AND METHOD FOR RESTRICTING PIVOTING OF INDUSTRIAL VEHICLES AXLES

(75) Inventor: Kazuo Ishikawa, Kariya (JP)

(73) Assignee: Kabushiki Kaisha Toyoda Jidoshokki Seisakusho, Kariya (JP)

( * ) Notice: Under 35 U.S.C. 154(b), the term of this patent shall be extended for 0 days.

This patent is subject to a terminal disclaimer.

(21) Appl. No.: 09/178,114

(22) Filed: Oct. 23, 1998

(30) Foreign Application Priority Data

Oct. 31, 1997 (JP) .................................................. 9-300725

(51) Int. Cl.⁷ ...................................................... G06F 7/70
(52) U.S. Cl. ................................ 701/50; 70/70; 280/754; 280/755; 187/222; 187/226
(58) Field of Search .................................. 701/50, 70, 37, 701/36, 38, 48, 79, 80, 81; 280/5.508, 6.154, 6.157, 754, 755, 124.112; 187/226, 222, 391, 394; 212/276, 294, 304

(56) References Cited

U.S. PATENT DOCUMENTS

| | | | |
|---|---|---|---|
| 3,976,302 | * 8/1976 | Hammarstrand | 280/6.154 |
| 4,264,014 | * 4/1981 | Hogg et al. | 280/754 |
| 4,393,959 | * 7/1983 | Acker | 280/755 |
| 5,447,331 | * 9/1995 | Barnhart | 280/6.157 |
| 5,639,119 | * 6/1997 | Plate et al. | 280/754 |
| 5,640,324 | * 6/1997 | Inagaki | 701/70 |
| 5,947,516 | * 9/1999 | Ishikawa | 280/755 |

FOREIGN PATENT DOCUMENTS

| | | |
|---|---|---|
| 58-211903 | 12/1983 | (JP) . |
| 9-315125 | 12/1997 | (JP) . |

OTHER PUBLICATIONS

Patent Abstracts of Japan, Publication No. 58–211903, Published Dec. 9, 1983.

* cited by examiner

Primary Examiner—Jaques H. Louis-Jacques
(74) Attorney, Agent, or Firm—Morgan & Finnegan, L.L.P.

(57) ABSTRACT

A method and apparatus for restricting pivoting of an industrial vehicle axle and maintaining the vehicle stability without sacrificing the vehicle's driving performance. Pivoting of the axle with respect to the vehicle's body is temporarily restricted in accordance with the yaw acceleration when the vehicle is turned. The acceleration value for limiting restriction is varied in accordance with the stability of the vehicle, which is determined by the state of the carried load. The limit value is relatively high when the load state causes the vehicle to be relatively stable and is relatively low when the load state causes the vehicle to be relatively unstable.

20 Claims, 7 Drawing Sheets

APPARATUS AND METHOD FOR RESTRICTING PIVOTING OF INDUSTRIAL VEHICLES AXLES

BACKGROUND OF THE INVENTION

The present invention relates to an apparatus and method for restricting pivoting of industrial vehicles axles.

In the prior art, industrial vehicles, such as forklifts, employ pivotal axles to improve the driving performance of the vehicle. For example, a forklift may have a pivotal rear axle, which is coupled to its vehicle body and supported such that the axle is pivotal relative to the body about a longitudinal axis, or roll axis, of the forklift. Such a pivotal axle permits the wheels of the forklift to follow the road surface and maintain stability. However, pivoting of the axle may result in excessive leaning of the forklift if the vehicle changes directions while moving at a high velocity when carrying a load that is heavy or held at a high position. Leaning of the forklift displaces the vehicle's center of gravity laterally (to the left or to the right) and destabilizes the vehicle. To solve this problem, an apparatus for temporarily restricting pivoting of the axle may be employed. The apparatus temporarily restricts pivoting of the axle when a condition that may decrease the lateral stability of the vehicle occurs.

A known apparatus for restricting pivoting of the axle determines the lateral stability of the forklift from the lateral acceleration and the yaw acceleration of the vehicle. If the vehicle is unstable, the apparatus restricts pivoting of the axle when the forklift turns.

The steps performed by the apparatus for restricting pivoting of the axle will now be described with reference to the graph of FIG. 10. The graph illustrates fluctuation of the yaw acceleration $\Delta\omega/\Delta t$ and the lateral acceleration g of the forklift when the vehicle is first driven straight at a constant velocity, then turned at an angle, and subsequently steered to travel straight again.

Figure 10:
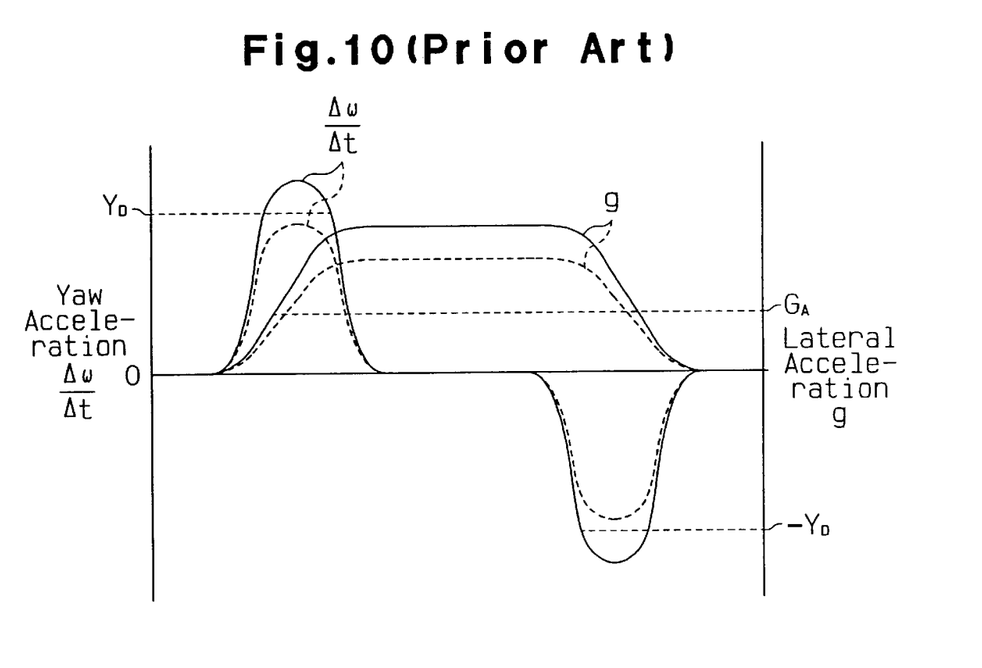
FIG. 10 is a graph showing the fluctuation of the yaw acceleration and the lateral acceleration when the vehicle is turned in the prior art.

As shown in FIG. 10, when the vehicle starts to turn, the yaw acceleration $\Delta\omega/\Delta t$ and the lateral acceleration g begin to increase concurrently. Once the turning radius decreases, the yaw acceleration $\Delta\omega/\Delta t$ beings to increase. In this state, the lateral acceleration g of the vehicle increases. As a result, the leaning amount, or tilting amount, of the vehicle body increases. The restriction apparatus locks and restricts further pivoting of the axle to prevent further leaning of the vehicle when the yaw acceleration $\Delta\omega/\Delta t$ reaches a limit value $Y_D$. Thus, the tilting of the body is limited when the vehicle is turned.

When the yaw acceleration $\Delta\omega/\Delta t$ reaches its peak and starts to decrease, the lateral acceleration g gradually levels off. As the steering angle of the vehicle becomes constant, the value of the yaw acceleration $\Delta\omega/\Delta t$ falls to zero and the lateral acceleration g becomes constant. However, if the value of the lateral acceleration g is large, the vehicle body leans excessively and lowers the lateral stability of the forklift. Furthermore, the lateral acceleration g may continue to increase even if the yaw acceleration $\Delta\omega/\Delta t$ starts to decrease after reaching its peak value. Therefore, the restriction apparatus also restricts pivoting of the axle when the lateral acceleration g reaches a limit value $G_A$. Accordingly, pivot restriction of the axle is carried out in accordance with the yaw acceleration $\Delta\omega/\Delta t$ and the lateral acceleration g when the forklift is turned.

If the forklift is steered to travel straight again, the lateral acceleration g decreases and becomes lower than the limit value $G_A$. Since the forklift is steered in the opposite direction to travel straight forward, the yaw acceleration $\Delta\omega/\Delta t$ decreases and becomes negative. When the lateral acceleration g falls below the limit value $G_A$, and the negative yaw acceleration $\Delta\omega/\Delta t$ becomes higher than the negative limit value $-Y_D$ after reaching its peak, the forklift becomes stable. Thus, the restriction apparatus permits pivoting of the axle.

However, when the forklift is turned, the tilting speed and amount of the vehicle body are determined by the vehicle's center of gravity in addition to the yaw acceleration $\Delta\omega/\Delta t$ and the lateral acceleration g, which are determined by the velocity and turning radius of the vehicle. In other words, the tilting speed and the amount of tilting of the body vary in accordance with the vehicle's center of gravity, which is determined by the weight and vertical position of the carried load, even under the same velocity and turning radius. If the center of gravity is located at a relatively high position, the tilting speed of the body increases when the forklift is turned. Furthermore, the maximum amount of tilting of the body increases even if the lateral acceleration g is the same.

On the other hand, if the center of gravity is located at a relatively low position when the forklift is turned, the tilting speed of the body becomes slower and the maximum amount of the tilting of the body becomes smaller even if the lateral acceleration g is the same. Hence, the amount of tilting of the body when the yaw acceleration $\Delta\omega/\Delta t$ reaches the limit value $Y_D$ varies in accordance with the position of the center of gravity. Accordingly, the lateral stability of the forklift when changing directions varies in accordance with the position of the vehicle's center of gravity.

If the forklift turns with its center of gravity located at a low position, for example, if the carried load is light or held at a low position, the limit value $Y_D$ related with the yaw acceleration $\Delta\omega/\Delta t$ can be determined such that pivoting of the axle is restricted when the amount of tilting of the body becomes relatively large. On the other hand, if the carried load is heavy or lifted to a high position, the limit value $Y_D$ can be determined such that pivoting of the axle is restricted when the amount of tilting of the body is still relatively small to stabilize the forklift. Since these two conditions do not overlap each other, a value optimal for both conditions cannot be selected as the limit value $Y_D$. Therefore, the limit value $Y_D$ is set at a value that guarantees stability when the load is heavy or held at a high position. This also guarantees stability when the forklift turns while carrying a load that is light or held at a low position.

The yaw acceleration $\Delta\omega/\Delta t$ varies in accordance with the vehicle velocity and the steering speed, which determine the turning radius. Therefore, an operator of the forklift has a tendency to steer the forklift slowly and carefully when the load is heavy or lifted to a high position. As shown by the dashed line in FIG. 10, in such case, the maximum value of the yaw acceleration $\Delta\omega/\Delta t$ may not reach the limit value $Y_D$.

As a result, if the forklift turns while carrying a load that is heavy or lifted to a high position, the yaw acceleration $\Delta\omega/\Delta t$ may not restrict pivoting of the axle at an early stage. Although pivoting would be restricted at a later stage when the lateral acceleration g exceeds the limit value $G_A$ (as shown by the dashed line in FIG. 10), the amount of tilting of the body would already have become relatively large. In such case, pivoting of the axle is not restricted when the amount of tilting of the body is still small if the restriction apparatus relies on the yaw acceleration $\Delta\omega/\Delta t$.

SUMMARY OF THE INVENTION

Accordingly, it is an objective of the present invention to provide an apparatus and method for restricting pivoting of an industrial vehicle axle that stabilizes the vehicle optimally in accordance with the state of the carried load.

To achieve the above objective, the present invention provides a method for controlling pivoting of an axle in an industrial vehicle. The vehicle supports the axle such that the axle is pivotal with respect to a body of the vehicle and is capable of carrying and moving a load. Pivoting of the axle is temporarily restricted in accordance with the result of comparison between the yaw acceleration of the vehicle and a yaw acceleration limit value. The method includes the steps of classifying the state of the load into a plurality of stability ranges, which are determined according to how the load state affects the stability of the vehicle. The ranges include a relatively high stability range and a relatively low stability range. The method also includes the step of setting the yaw acceleration limit value in accordance with the current state of the load. The yaw acceleration limit value is set at a relatively low value when the load state is in the relatively low stability range. The yaw acceleration limit value is set at a relatively high value when the load state is in the relatively high stability range. The method further includes the step of temporarily restricting pivoting of the axle when the yaw acceleration becomes equal to or higher than the yaw acceleration limit value.

In a further aspect of the present invention, an apparatus for controlling pivoting of an axle in an industrial vehicle is provided. The vehicle supports the axle such that the axle is pivotal with respect to a body of the vehicle and is capable of carrying and moving a load. The apparatus includes a yaw acceleration detector for detecting the yaw acceleration of the vehicle when the vehicle is turned. A pivot restricting mechanism restricts pivoting of the axle in accordance with the detected yaw acceleration. A setting device sets the yaw acceleration limit value in accordance with the current state of the load. Possible load states are classified into a plurality of stability ranges according to how the load state affects the stability of the vehicle. The ranges include a relatively high stability range and a relatively low stability range. The yaw acceleration limit value is set at a relatively low value when the load state is in the relatively low stability range. The yaw acceleration limit value is set at a relatively high value when the load state is in the relatively high stability range. A load detector detects the load state. A restriction controller temporarily restricts pivoting of the axle when the yaw acceleration detected by the yaw acceleration detector becomes equal to or higher than the set yaw acceleration limit value. The restriction controller further restricts pivoting of the axle in accordance with the result of a comparison between the lateral acceleration of the vehicle and a lateral acceleration limit value when the yaw acceleration is lower than the yaw acceleration limit value.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

An embodiment according to the present invention will now be described with reference to FIGS. 1 to 9. FIG. 2 shows a forklift 1, which is a front drive, rear steering, four wheel vehicle and has a body 2. The body 2 has a front portion to which the lower end of an outer mast 3 is secured. The outer mast 3 is supported such that it is tiltable toward the front and the rear. The outer mast 3 also supports inner masts 4 such that the inner masts 4 can be lifted and lowered. Each inner mast 4 supports a lift bracket 5b, to which a fork 5a is secured, such that the lift bracket 5b can be lifted and lowered. A sprocket wheel 6 is arranged on the upper portion of the inner mast 6. A chain (not shown) connects the sprocket wheel 6 and the lift bracket 5b.

A lift cylinder 7, which is arranged behind the outer mast 3, has a piston rod (not shown) that is connected to the upper portion of each inner mast 4. A tilt cylinder 8, which is arranged at the front portion of the body 2, has a piston rod 8a that is connected to the outer mast 3.

A yaw rate sensor 9 is arranged at the front portion of the body 2. A piezoelectric vibration gyroscope may be employed as the yaw rate sensor 9.

Figure 1:
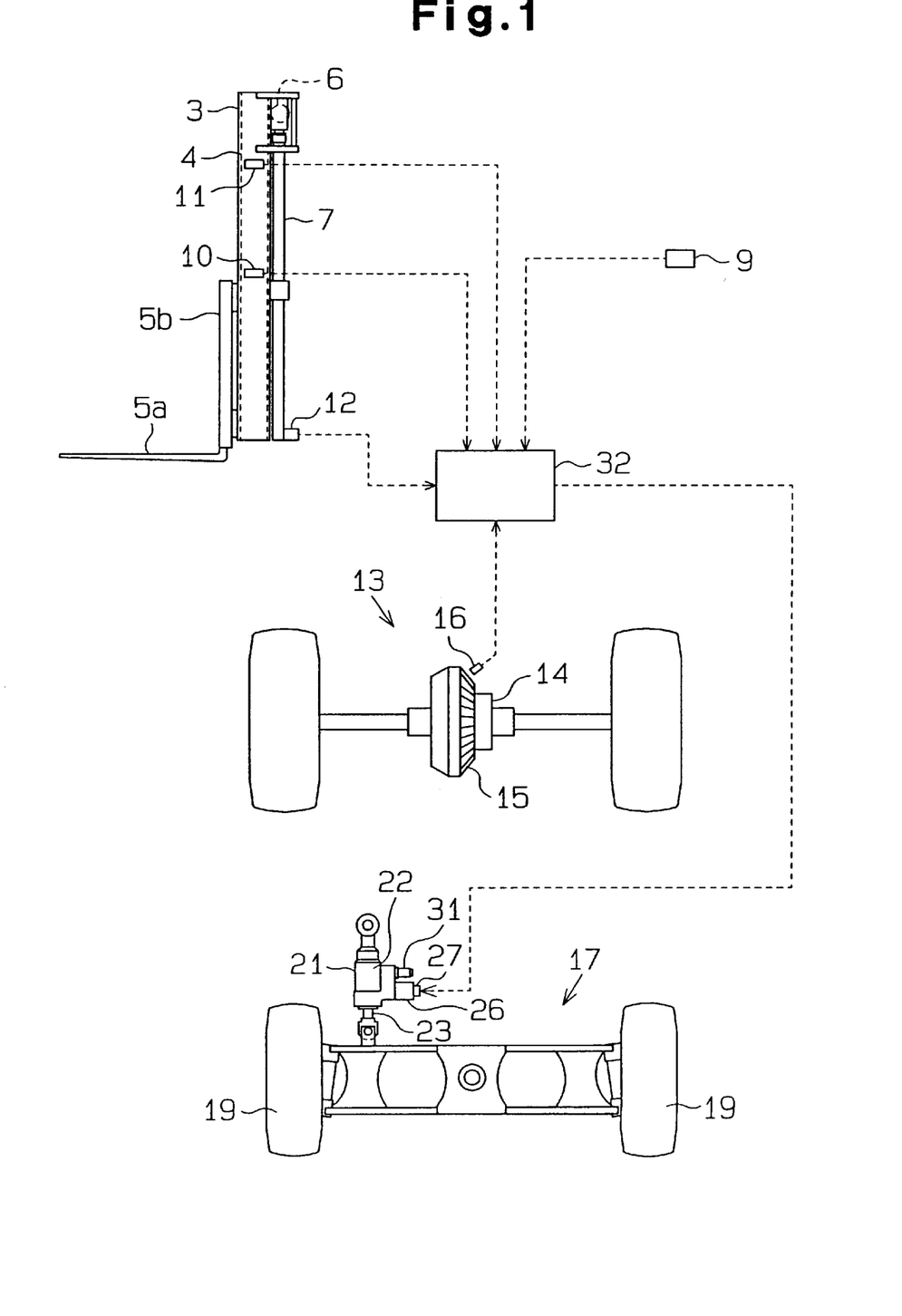
FIG. 1 is a diagrammatic view showing an axle pivot restriction apparatus according to the present invention.
Figure 2:
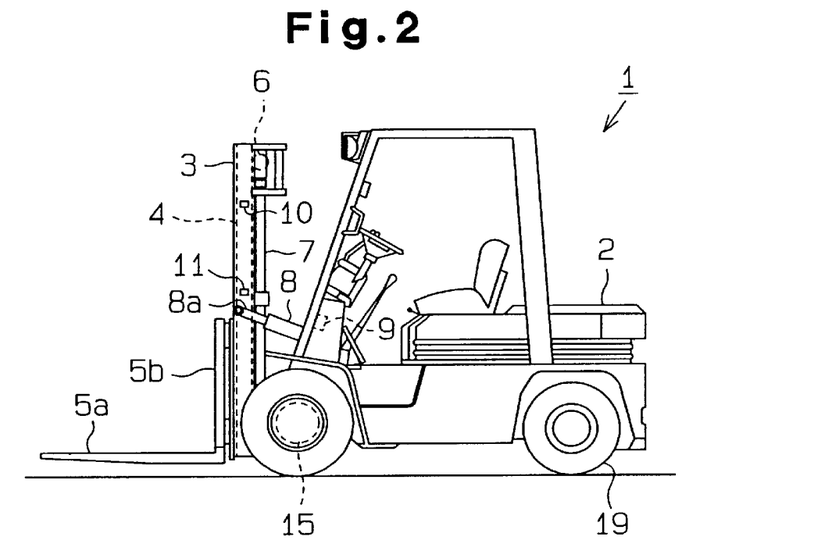
FIG. 2 is a side view showing a forklift.

FIG. 1 is a diagrammatic view showing the structure of an apparatus for restricting pivoting of an axle. As shown in the drawing, a first height switch 10 and a second height switch 11 are attached to the outer mast 3 at different heights to detect the vertical position of the forks 5a. Limit switches may be employed as the height switches 10, 11. A pressure sensor 12, which serves as a load detecting means, is provided on the tilt cylinder 8 to detect the hydraulic pressure in the cylinder 8. The hydraulic pressure changes in accordance with the weight of the load carried by the forklift. A strain gauge type pressure sensor may be employed as the pressure sensor 12. The first height switch 10 and the second height switch 11 define a height detector. The first height switch 10, the second height switch 11, and the pressure sensor 12 define a load detector.

A front axle 13 is supported at the front portion of the body 2. A differential case 14 is arranged on the front axle 13. A ring gear 15 is fixed to the differential case 14. A vehicle velocity sensor 16 detects the rotating speed of the ring gear 15. A magnetic sensor having a magnetic detecting element such as a Hall element may be employed as the velocity sensor 16.

Figure 3:
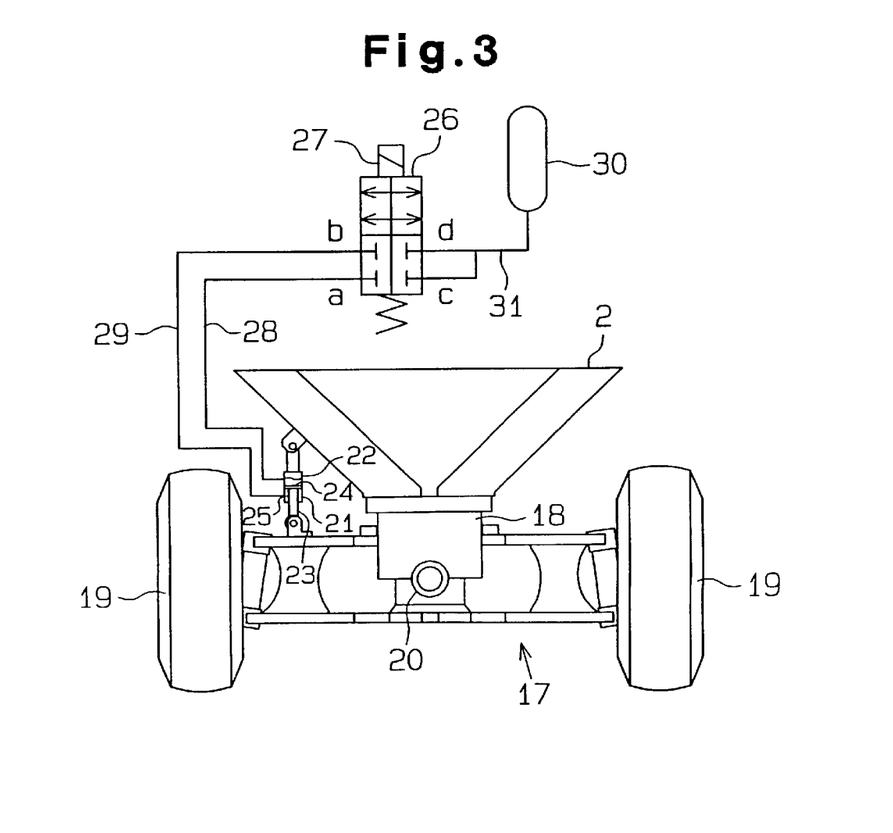
FIG. 3 is a diagrammatic rear view showing the body and the rear axle.

FIG. 3 is a diagrammatic rear view showing a rear axle 17 and a hydraulic circuit. An axle support 18 is defined at the lower portion of the body 2 to support the rear axle 17. A rear wheel 19, which is used to steer the forklift 1, is mounted on each end of the rear axle 19. The rear axle 17 is pivotal about a pivot shaft 20. Thus, the rear axle 17 is pivotal with respect to the body 2 about a longitudinal, or roll axis.

A dual-action type hydraulic cylinder 21 is arranged between the body 2 and the rear axle 17 to restrict pivoting of the rear axle 17 with respect to the body 2. The hydraulic cylinder 21 has a cylinder tube 22, which is coupled to the body 2 such that the tube 22 is pivotal with respect to the body 2, and a piston rod 23, which is coupled to the rear axle 17 such that the rod 23 is pivotal with respect to the rear axle 17.

The piston rod 23 defines a first chamber 24 and a second chamber 25 in the hydraulic cylinder 23. The first and second chambers 24, 25 are selectively connected to and disconnected from each other by an electromagnetic valve 26.

The electromagnetic valve 26 is a four port-two way switching valve having ports a, b, c, d. The electromagnetic valve further includes a spool (not shown) and an electromagnetic solenoid 27. The solenoid 27 shifts the spool between a connection position and a disconnection position. At the connection position, the spool connects port a to port c and port b to port d. At the disconnection position, the spool disconnects the associated ports a, c and b, d from each other. The electromagnetic valve 26 is normally closed. Thus, if the solenoid 27 is not excited, the spool is shifted to the disconnection position by a spring.

The first chamber 24 is connected to port a by a passage 28, while the second chamber 25 is connected to port b by a passage 29. A passage 31 connects ports c and d to an accumulator 30, which is formed integrally with the hydraulic cylinder 31. The hydraulic cylinder 21, the electromagnetic valve 27, and the accumulator 30 form a pivot restricting mechanism.

A pivot control unit 32 is arranged on the body 2. The control unit 32 controls and restricts pivoting of the rear axle 17 with respect to the body 2.

Figure 4:
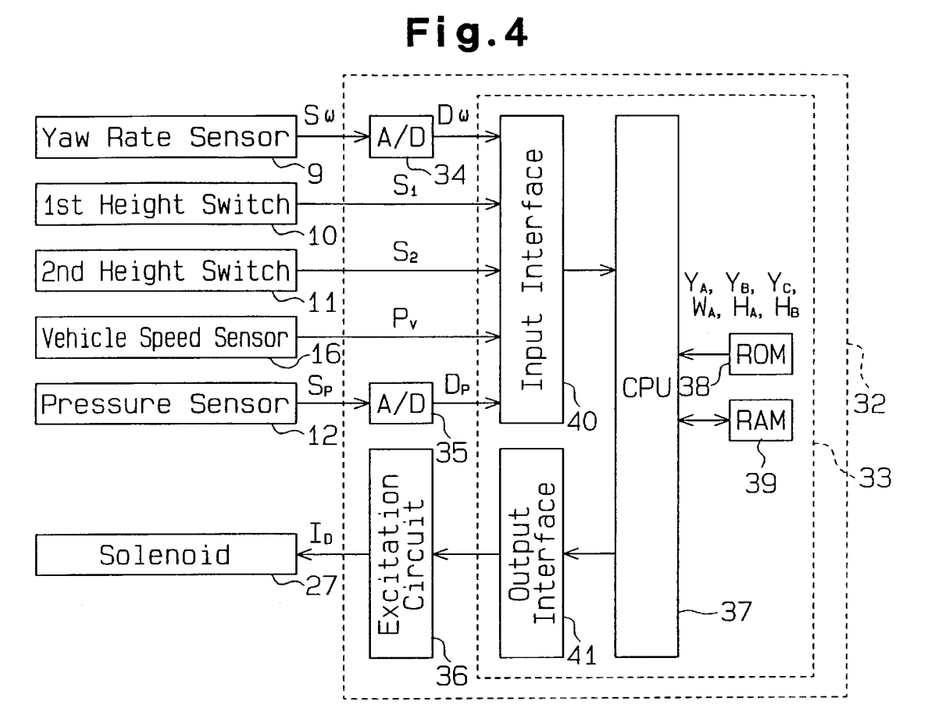
FIG. 4 is a block diagram showing the electric structure of the axle pivot restriction apparatus.

FIG. 4 is a block diagram showing the electric structure of the pivot control unit 32. As shown in the diagram, the input side of the control unit 32 is electrically connected to the yaw rate sensor 9, the first height switch 10, the second height switch 11, the pressure sensor 12, and the velocity sensor 16. The output side of the control unit 32 is electrically connected to the solenoid 27 of the hydraulic cylinder 21 by an excitation circuit 36.

The yaw rate sensor 9 sends an analog yaw rate signal $S\omega$, which corresponds to the yaw rate $\omega$ when the vehicle turns, to the control unit 32. The first height switch 10 is turned off when the lift bracket 5b is located at a vertical position H lower than a first reference height $H_A$, which is set at a relatively low position within the moving range of the lift bracket 5b, and is turned on when the lift bracket 5b is located at or above the first reference height $H_A$. Furthermore, the first height switch 10 sends ON/OFF signals S1, which indicates the state of the height switch 10, to the control unit 32. The second height switch 11 is turned off when the lift bracket 5b is located at a vertical position H lower than a second reference height $H_B$, which is set at a position higher than the first reference height $H_A$, and is turned on when the lift bracket 5b is located at or above the second reference height $H_B$. Furthermore, the second height switch 11 sends ON/OFF signals S2, which indicates the state of the height switch 11, to the control unit 32. The velocity sensor 16 sends pulse signals $P_v$ to the control unit 32 in correspondence with the rotating speed of the ring gear 15, which is proportional to the vehicle velocity v.

The control unit 32 further includes a microcomputer 33, analog to digital (A/D) converters 34, 35. The microcomputer 33 has a central processing unit (CPU) 37, a read only memory (ROM) 38, a random access memory (RAM) 39, an input interface 40, and an output interface 41. The yaw rate sensor 9 and the microcomputer 33 define a yaw acceleration detection means.

The ON/OFF signals S1, S2 of the respective height switches 10, 11 and the vehicle velocity pulse signals P of the velocity sensor 16 are sent to the CPU 37 by way of the input interface 40. The yaw rate signal $D\omega$ of the yaw rate sensor 9, which is the signal $S\omega$ digitized by the A/D converter 34, and the pressure signal $D_P$ of the pressure sensor 12, which is the signal $S_P$ digitized by the A/D converter 35, are also sent to the CPU 37 by way of the input interface 40.

The CPU 37 sends a control signal to the excitation circuit 36 by way of the output interface 41. The excitation circuit 36 then causes an excitation current ID to flow through the solenoid 27.

The ROM 38 stores a program for temporarily restricting pivoting of the rear axle 17 by having the pivot control unit 32 restrict the extension and retraction of the hydraulic cylinder 21. Pivoting of the rear axle 17 with respect to the body 2 is temporarily restricted based on the yaw acceleration $\Delta\omega/\Delta t$ when the vehicle is turned. When the lateral stability of the forklift becomes relatively low as the vehicle turns, the yaw acceleration $\Delta\omega/\Delta t$ is compared with a low limit value. If the yaw acceleration $\Delta\omega/\Delta t$ exceeds the low limit value, pivoting of the rear axle 17 is restricted. When the lateral stability of the forklift is relatively high when the vehicle turns, the yaw acceleration $\Delta\omega/\Delta t$ is compared with a high limit value. If the yaw acceleration $\Delta\omega/\Delta t$ exceeds the high limit value, pivoting of the rear axle 17 is restricted.

The ROM 38 further stores a weight limit $W_A$, which is compared with the weight W of the load carried by the forklift, to judge whether the load causes the lateral stability of the forklift to be relatively high or relatively low. The ROM 38 also stores the first height limit $H_A$, which is compared with the vertical position H of the load carried by the forklift, to judge whether the load causes the lateral stability of the forklift to be in a relatively high state or a relatively low state.

The lateral stability of the vehicle when the vehicle turns, that is, the degree to which the vehicle withstands rolling when the vehicle changes directions, varies in accordance with the vertical position of the forklift's center of gravity even under the same vehicle velocity v and the same turning radius. Accordingly, the lateral stability of the vehicle changes in accordance with the state of the carried load. In other words, the lateral stability changes in accordance with the weight W and vertical position H of the carried load.

The stability of the vehicle is high when the load weight W is equal to or lighter than the weight limit $W_A$ and the vertical position H of the load is located at or below the first height $H_A$. The stability of the vehicle is low when the load weight W exceeds the weight limit $W_A$ or when the vertical position H of the load is located at above the first height $H_A$. The values of the weight limit $W_A$ and the first height $H_A$ are obtained through experiments or theoretical calculations.

Figure 5:
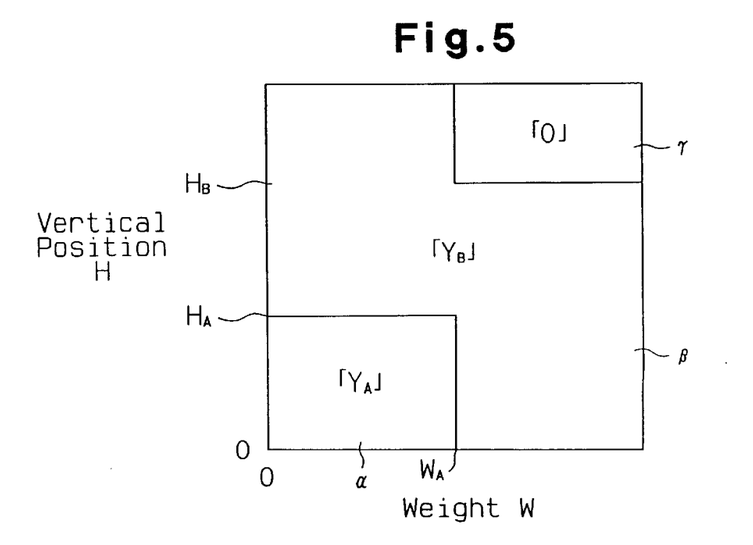
FIG. 5 is a map showing the relationship between the state of the carried load and the limit values of the yaw acceleration.

FIG. 5 is a map used to select the limit value $Y_X$ in accordance with the state of the carried load, which is determined by the weight W and the vertical position H of the load. As shown in the map, if the vehicle is driven straight and is then turned at a constant steering angle in a highly stable state, such as when the load weight W is equal to or lower than the weight limit $W_A$ and when the load's vertical position H is located at or below the first height limit $H_A$ (e.g., 2000 mm), the yaw acceleration $\Delta\omega/\Delta t$ is compared with a high stability limit value $Y_A$. The map shows that the vehicle is in a high stability range $\alpha$ under such conditions. The high stability limit value $Y_A$ is set at a relatively high value (e.g., $900 \times 10^{-3}$ rad/sec$^2$) such that pivoting of the rear axle 17 is not restricted when the amount of tilting of the body 2 is still small even if the yaw acceleration $\Delta\omega/\Delta t$ increases by a certain amount. Thus, pivoting of the rear axle 17 is permitted to maintain high driving performance.

If the vehicle is driven straight and then turned at a constant steering angle in an unstable state, such as when the load weight W exceeds the weight limit $W_A$ and the load's vertical position H is located above the first height limit $H_A$, the yaw acceleration $\Delta\omega/\Delta t$ is compared with a low stability limit value $Y_B$. The map shows that the vehicle is in a first low stability range $\beta$ under such conditions. The low stability reference value $Y_B$ is set at a relatively low value (e.g., $400 \times 10^{-3}$ rad/sec$^2$) such that pivoting of the rear axle 17 is restricted even when the body 2 is not tilted very much without waiting until the yaw acceleration $\Delta\omega/\Delta t$ increases by a certain amount. The limit values $Y_A$, $Y_B$ are determined through experiments.

The ROM further stores a second height limit $H_B$, which is used together with the weight limit $W_A$ to judge whether the vehicle has entered a second low stability range y, which is more unstable then the first low stability range $\beta$. As shown in the map of FIG. 5, if the load weight W exceeds the weight limit $W_A$ and the load's vertical position H is located above the first height limit $H_A$, the limit value related to the yaw acceleration $\Delta\omega/\Delta t$ is set at zero. When the forklift enters the second low stability range γ, pivoting of the rear axle 17 is restricted to restrict further tilting of the body 2 even if the vehicle is driven straight and is not turned. This guarantees lateral stability of the vehicle.

Figure 6:
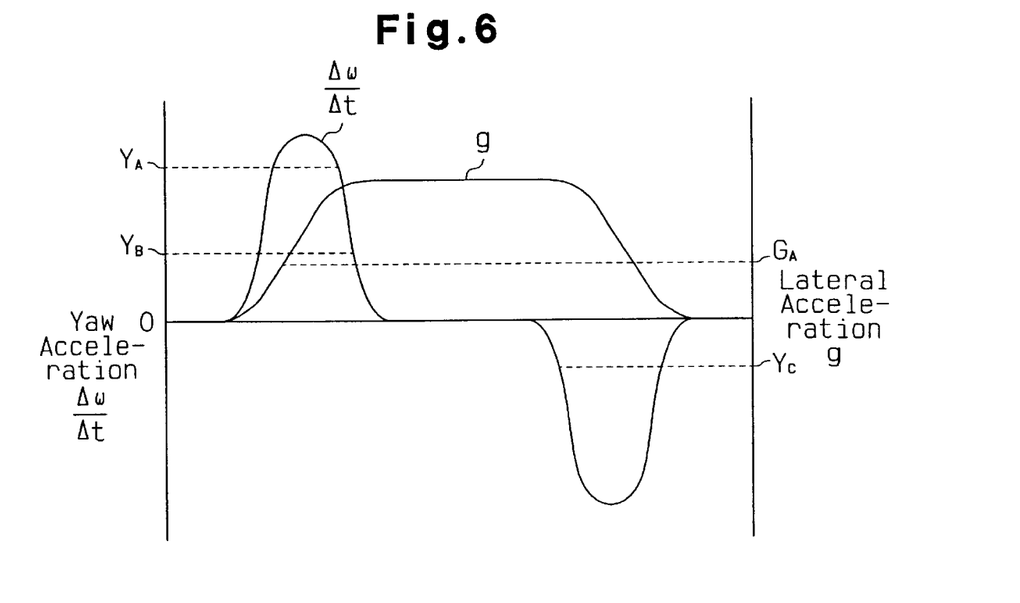
FIG. 6 is a graph showing the fluctuation of the yaw acceleration and the lateral acceleration when the vehicle is turned.

FIG. 6 is a graph illustrating fluctuations of the yaw acceleration $\Delta\omega/\Delta t$ and the lateral acceleration g when the forklift is driven straight, is then turned, and then steered to be driven straight again. In this graph, the vehicle velocity v is constant.

As shown in FIG. 6, as the forklift turns at a constant steering angle after having traveled straight forward, the yaw acceleration $\Delta\omega/\Delta t$ increases once and the lateral acceleration g increases to a certain value. Thus, when the yaw acceleration $\Delta\omega/\Delta t$ exceeds either one of the limit values $Y_A$, $Y_B$, pivoting of the rear axle 17 is restricted. The lateral acceleration g subsequently exceeds its limit value $G_A$. This causes continuous restriction of the rear axle 17. As the vehicle continues to turn at a constant steering angle, the yaw acceleration $\Delta\omega/\Delta t$ starts to fall until it becomes null while the value of the lateral acceleration g becomes constant. When the forklift completes turning and is steered to travel straight again, the yaw acceleration $\Delta\omega/\Delta t$ decreases temporarily. The lateral acceleration also decreases. The yaw acceleration $\Delta\omega/\Delta t$ drops until it reaches its negative peak and then rises. Afterward, when the yaw acceleration $\Delta\omega/\Delta t$ becomes higher than its negative limit value $Y_c$ and the lateral acceleration g becomes lower than the limit value $G_A$, the rear axle 17 is released from the restricted state and permitted to pivot.

As shown in the graph, the high stability limit value $Y_A$ and the low stability limit value $Y_B$ are values that the yaw acceleration $\Delta\omega/\Delta t$ takes before reaching its peak when the vehicle is turned while traveling straight forward. The low stability limit value $Y_B$ is set at a value that is lower than the high stability limit value $Y_A$. Thus, when the vehicle is turned when its stability is in the first low stability range $\beta$, the yaw acceleration $\Delta\omega/\Delta t$ reaches the limit value $Y_X$ earlier than when the stability is in the high stability range $\alpha$. Accordingly, if the forklift is in the first low stability range $\beta$, pivoting of the rear axle 17 is restricted earlier. This decreases the maximum tilt of the body 1 and thus maintains the stability of the vehicle. When the vehicle is turned with its stability in the high stability range $\alpha$, pivot restriction of the rear axle 17 is delayed to enhance driving performance.

Figure 7:
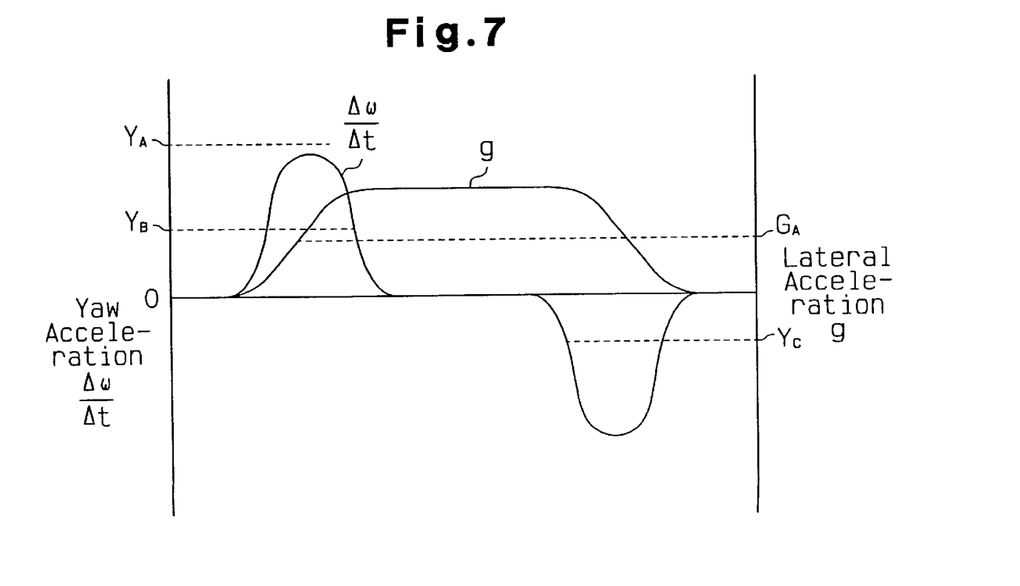
FIG. 7 is a graph showing the fluctuation of the yaw acceleration and the lateral acceleration when the vehicle is turned.

FIG. 7 is a graph illustrating fluctuations of the yaw acceleration $\Delta\omega/\Delta t$ and the lateral acceleration g when the forklift is driven straight, is then turned, and then is steered to be driven straight again. The graph was plotted with the stability of the vehicle included in the first low stability range $\beta$. The forklift is driven at a low velocity v and the steering wheel is turned at a low steering speed. Thus, the turning radius in FIG. 7 is the same as that of FIG. 6, but the peak values of the yaw acceleration $\Delta\omega/\Delta t$ and the lateral acceleration g are smaller.

As shown in the graph of FIG. 7, the yaw acceleration $\Delta\omega/\Delta t$ does not reach the high stability limit value $Y_A$ but, however, it reaches the low stability limit value $Y_B$, which is lower than the high stability limit value $Y_A$.

The ROM 38 stores the limit value $G_A$, which is related to the lateral acceleration g. The limit value $G_A$ is set at a value that ensures lateral stability when the vehicle with its stability included in the first low stability range $\beta$. As shown in FIGS. 6 and 7, the limit value $G_A$ is set to be included in a time range starting from when the yaw acceleration $\Delta\omega/\Delta t$ exceeds either the high stability limit value $Y_A$ or the low stability limit value $Y_B$ to when the yaw acceleration $\Delta\omega/\Delta t$ returns to the high stability limit value $Y_A$ or the low stability limit value $Y_B$.

The ROM 38 further stores a release value $Y_C$ (e.g., $280 \times 10^{-3}$ rad/sec$^2$). The release value $Y_C$ is related to the yaw acceleration $\Delta\omega/\Delta t$ and is set at a value that would not affect the stability of the forklift regardless of whether the forklift is in the high stability range $\alpha$ or the low stability range $\beta$. When the yaw acceleration $\Delta\omega/\Delta t$ reaches the release value $Y_C$, the amount of tilting of the body 2 does not increase even when the rear axle 17 is released from the restricted state. The release value $Y_C$ is determined through theoretical calculations and experiments.

The CPU 37 performs pivot control of the rear axle in a cyclic manner for every predetermined time period based on the stored program.

The CPU 37 first determines the state of the load carried by the forklift based on the weight W detected by the pressure sensor 12 and the vertical position H detected by the height switches 10, 11. If the weight W is equal to or lower than the weight limit $W_A$ and the vertical position H is located at or below the first height limit $H_A$, the CPU 37 determines that the stability of the vehicle is included in the high stability range $\alpha$. If the weight W exceeds the weight limit $W_A$ and the vertical position H is located above the second height limit $H_B$, the CPU 37 determines that the stability of the vehicle included in the second low stability range γ, which indicates that the stability is lower than that of the first low stability range $\beta$. If the weight W exceeds the weight limit $W_A$, but the vertical position is lower than the second height limit $H_B$, the CPU 37 determines that the stability of the vehicle is in the first low stability range $\beta$.

Also, if the vertical position H exceeds the first height limit $H_A$ but the weight W is less than the weight limit $W_A$, the stability is determined to be in the first low stability range β.

When the stability is in the high stability range α, the CPU 37 sets the limit value $Y_X$ at the high stability limit value $Y_A$. In this state, if the forklift is turned, the pivot restriction of the rear axle 17 is relatively delayed.

On the other hand, if the vehicle stability is included in the first low stability range β, the CPU 37 sets the limit value $Y_X$ at the low stability limit value $Y_B$. Thus, when the forklift is turned, pivot restriction of the rear axle 17 is relatively advanced.

If the vehicle stability is in the second low stability range γ, the CPU 37 sets the limit value $Y_X$ to zero to restrict pivoting of the rear axle 17 regardless of whether the forklift is traveling straight or is being turned.

The CPU 37 computes the yaw acceleration $\Delta\omega/\Delta t$ from the present yaw rate ω and the previous yaw rate ω, which was detected during the previous cycle. If the yaw acceleration $\Delta\omega/\Delta t$ exceeds the limit value $Y_X$, the CPU 37 sets a pivot restriction flag FGL to one.

The CPU 37 also computes the lateral acceleration g from the detected yaw rate ω and the vehicle velocity v. The CPU 37 also sets the pivot restriction flag FGL to one if the computed lateral acceleration g exceeds the limit value $G_A$. Thus, pivot restriction of the rear axle 17 continues even after the yaw acceleration $\Delta\omega/\Delta t$ drops from its peak and falls below the limit value $Y_X$ when the forklift is turned.

If it is determined that the yaw acceleration $\Delta\omega/\Delta t$ is lower than the limit value $Y_X$ and the lateral acceleration g is lower than the limit value $G_A$, the CPU 37 judges whether or not the absolute value of the yaw acceleration $\Delta\omega/\Delta t$ is equal to or lower than the absolute value of the release value $Y_C$. If it is determined that the yaw acceleration $\Delta\omega/\Delta t$ is equal to or lower than the release value $Y_C$, the CPU 37 judges whether or not the vehicle is stable. If the yaw acceleration $\Delta\omega/\Delta t$ does not reach the selected limit value $Y_A$, $Y_B$, the vehicle is deemed to be stable. If the rear axle 17 can be released from a restricted state without causing undesirable tilting of the body 2 when the forklift turns, this would also indicate that the vehicle is stable. When it is determined that the vehicle is stable, the CPU 37 sets the pivot restriction flag FGL to zero.

The CPU 37 controls the excitation circuit 36 in accordance with the value of the pivot restriction flag FGL to excite or de-excite the solenoid 27 and thus restrict extension and retraction of the hydraulic cylinder 21.

Figure 8:
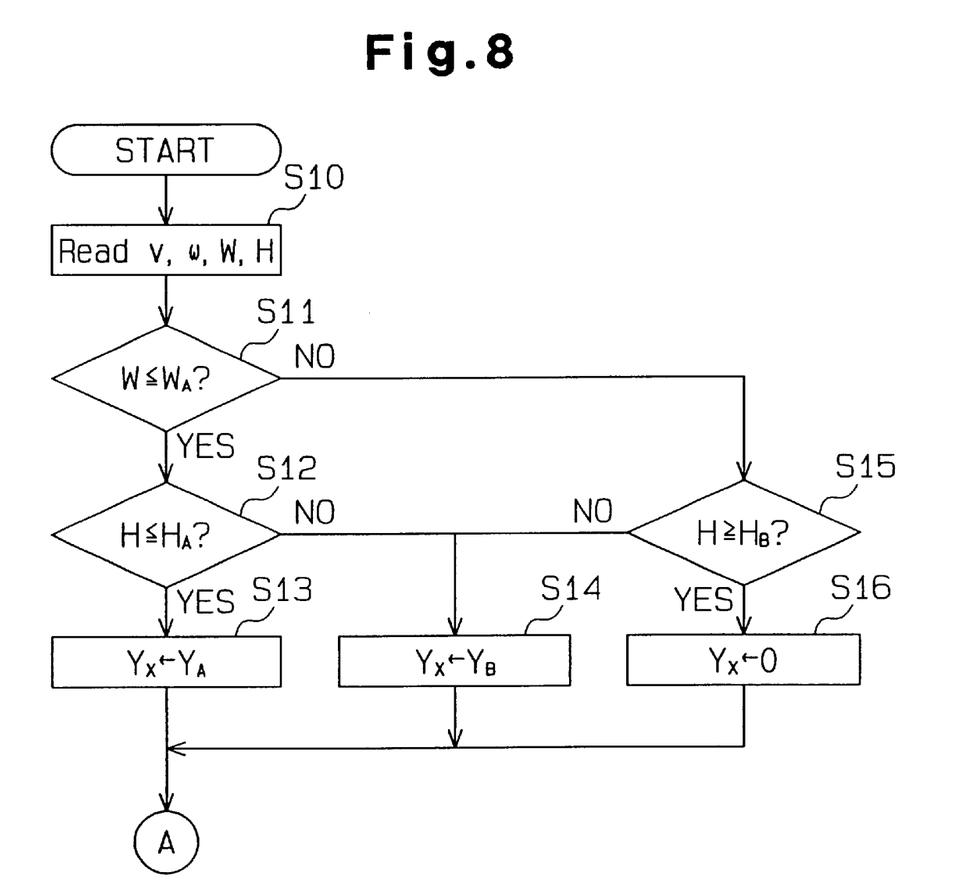
FIG. 8 is a flowchart showing a program executed to control axle pivoting.
Figure 9:
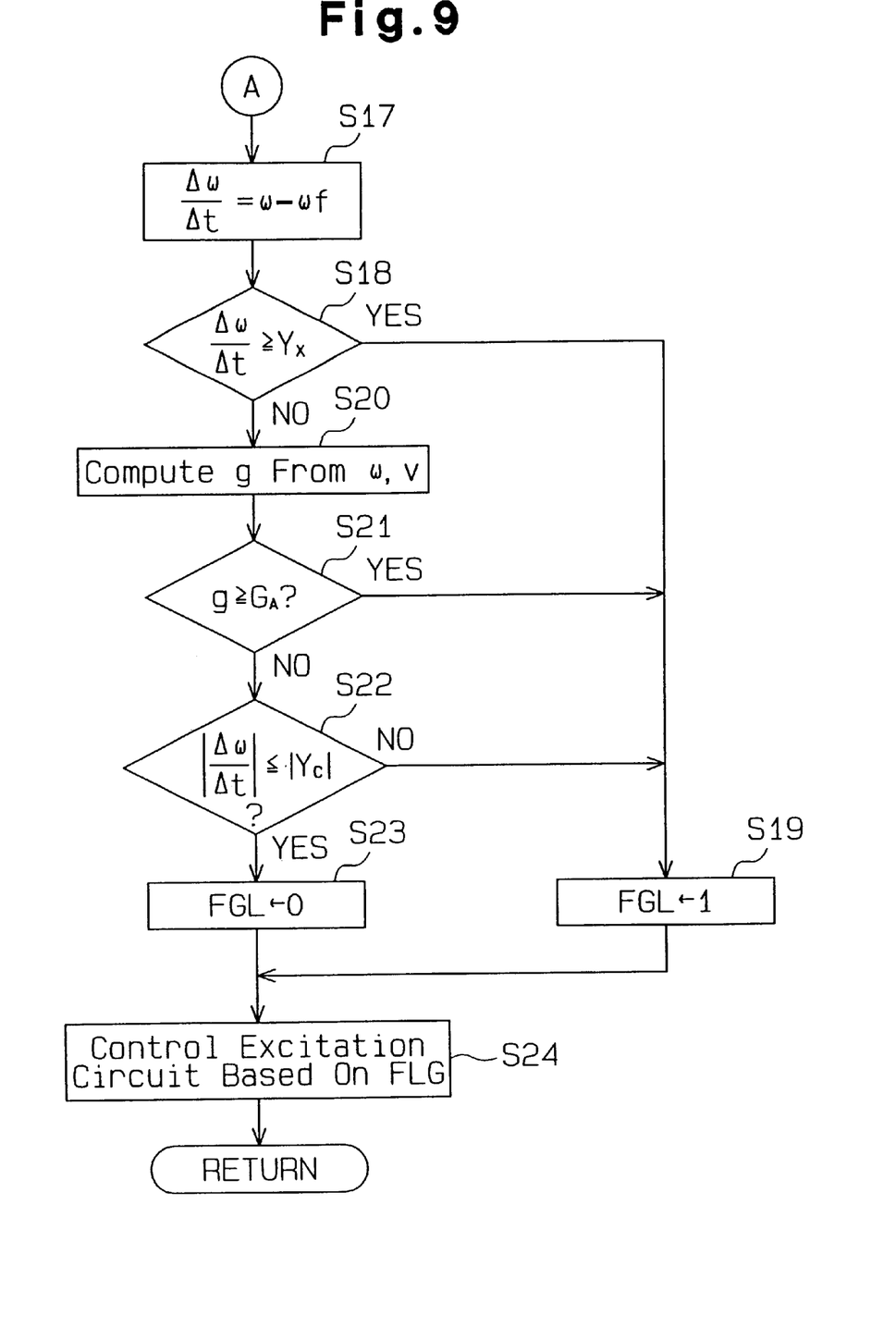
FIG. 9 is a continuation of the flowchart of FIG. 9 showing the program executed to control axle pivoting.

The operation of the apparatus for restricting pivoting of the rear axle 17 will now be described with reference to the flowcharts shown in FIGS. 8 and 9. The CPU 37 first performs step S10 and reads the detected vehicle velocity v, the yaw rate ω, the load weight W, and the load's vertical position H.

At step S11, the CPU 37 judges whether or not the detected weight W is equal to or lighter than the weight limit $W_A$. If it is determined that the weight W is equal to or lighter than the weight limit $W_A$, the CPU 37 proceeds to step S12 and judges whether or not the vertical position H is the same as or lower than the first height limit $H_A$. If it is determined that the vertical position H is the same as or lower than the first height limit $H_A$, the CPU 37 proceeds to step S13 and sets the limit value $Y_A$ as the limit value $Y_X$. In other words, if the carried load causes the stability of the forklift to be in the high stability range α, the limit value $Y_A$ is set as the limit value $Y_X$.

If it is determined that the vertical position H is higher than the first height limit $H_A$ in step S12, the CPU 37 proceeds to step S14 and sets the limit value $Y_B$ as the limit value $Y_X$.

If it is determined that the weight W exceeds the weight limit $W_A$ in step S11, the CPU 37 proceeds to step S15 and judges whether or not the vertical position H is the same as or higher than the second height limit $H_B$. If it is determined that the vertical position H is lower than the second height limit $H_B$, the CPU 37 proceeds to step S14 and sets the low stability limit value $Y_B$ as the limit value $Y_X$. In other words, if the carried load causes the stability of the forklift to be in the first low stability range β, the low stability limit value $Y_B$ is set as the limit value $Y_X$.

If it is determined that the vertical position H is the same as or higher than the second height limit $H_B$ in step S15, the CPU 37 proceeds to step S16 and sets zero as the limit value $Y_X$. In other words, if the carried load puts the forklift in the second low stability range γ, zero is set as the limit value $Y_X$.

The CPU 37 then proceeds to step S17 and computes the yaw acceleration $\Delta\omega/\Delta t$ from the present yaw rate ω and the yaw rate ω detected during the previous cycle. At step S18, the CPU 37 judges whether or not the computed yaw acceleration $\Delta\omega/\Delta t$ is equal to or greater than the selected limit value $Y_X$. If it is determined that the computed yaw acceleration $\Delta\omega/\Delta t$ is equal to or greater than the set limit value $Y_X$ in step S18, the CPU 37 proceeds to step S19 and sets the pivot restriction flag FGL to one.

If it is determined that the yaw acceleration $\Delta\omega/\Delta t$ is less than limit value $Y_X$ in step S18, the CPU 37 proceeds to step S20 and computes the lateral acceleration g from the yaw rate ω and the vehicle speed v. At step S21, the CPU 37 judges whether or not the lateral acceleration g computed in step S21 is equal to or higher than the limit value $G_A$. If it is determined that the lateral acceleration g is lower than the limit value $G_A$, the CPU 37 proceeds to step S22 and judges whether or not the absolute value of the yaw acceleration $\Delta\omega/\Delta t$ is equal to or lower than the absolute value of the release value $Y_C$. In step S21, if it is determined that the lateral acceleration g is equal to or higher than the limit value $G_A$, the CPU 37 proceeds to step S19.

The CPU 37 proceeds to step S24 from step S19 and step S23. At step S24, the CPU 37 controls the excitation circuit 36 such that the solenoid 27 is supplied with excitation current ID if the pivot restriction flag FGL is set at zero, and such that the solenoid 27 is de-excited when the flag FGL is set at one.

Accordingly, under the same vehicle speed v and the same turning radius, pivoting of the rear axle 17 would be relatively delayed if the stability of the vehicle is in the high stability range α when changing directions. On the other hand, if the stability is included in the first low stability range β when the forklift changes directions, pivoting of the rear axle 17 is restricted at a relatively early stage to restrict the tilted amount of the body 2. If the stability is in the second low stability range γ, pivoting of the rear axle 17 is restricted even if the vehicle is traveling straight forward.

When the forklift is turned when the vehicle stability is in the first low stability range β, the vehicle velocity v and the rotating speed of the steering wheel may be low. This may enlarge the turning radius of the vehicle and lower the peak value of the yaw acceleration $\Delta\omega/\Delta t$. However, the value of the yaw acceleration $\Delta\omega/\Delta t$ that restricts pivoting of the rear axle 17 is set at a value lower than that when the stability is in the high stability range α.

When the forklift is steered to travel straight forward after being steered to change directions, the rear axle 17 is released only when tilting of the body 2 would not affect the lateral stability of the vehicle, regardless of whether the stability is in the high stability range α, the first low stability range β, or the second low stability range γ.

As described above, the apparatus for restricting pivoting of the rear axle 17 has the advantages described below.

(a) If the forklift is turned when the stability of the vehicle is relatively low (first low stability range β), the value of the yaw acceleration Δω/Δt that restricts pivoting of the rear axle 17 (limit value $Y_B$) is relatively low. If the forklift is turned when the stability is relatively high (high stability range α), the value of the yaw acceleration Δω/Δt that restricts pivoting of the rear axle 17 (limit value $Y_A$) is relatively high.

Accordingly, if the forklift is turned under the same vehicle speed v and the same turning radius but the stability of the vehicle differs (between the high stability range α and first low stability range β), pivoting of the rear axle 17 is restricted at a relatively earlier stage when the stability is low. This prevents unnecessary restriction of the rear axle 17 when the maximum amount of tilting of the body 2 is low and the stability of the vehicle is high. In such state, pivoting of the rear axle 17 improves the driving performance of the vehicle. Furthermore, pivoting of the rear axle 17 is permitted when the amount of tilting of the body 2 is still small if the vehicle is unstable.

(b) When the vehicle is in a relatively unstable state (first low stability range β), pivoting of the rear axle 17 is restricted in accordance with the yaw acceleration Δω/Δt associated with the low stability range β regardless of the fact that the peak value of the yaw acceleration Δω/Δt is smaller than that when the vehicle is in a relatively stable state (high stability range α). The pivot restriction of the rear axle 17 based on the yaw acceleration Δω/Δt maintains the lateral stability of the forklift regardless of the state of the carried load.

(c) The state of the forklift when carrying a load is determined from the weight W and vertical position H of the load. Thus, the stability of the forklift when the vehicle changes directions is determined in a simple manner.

(d) The weight W of the load is detected by a weight detector and the vertical position H of the load is detected by a height detector. Thus, the stability of the forklift when the vehicle changes directions is detected in a simple manner.

(e) The microcomputer 33 serves as a limit setting device, a load detector, and a pivot restriction controller. In other words, the functions of these elements are achieved by a program stored in a computer. Hence, parameters such as the limit value may be changed easily for each type of vehicle even when using the same computer.

(f) The yaw rate ω of the forklift when the vehicle changes directions is directly detected by the yaw rate sensor 9. Thus, the yaw rate ω need not be computed based on the vehicle speed v and the steering angle of the steering wheel. This simplifies the program for restricting pivoting of the rear axle 17.

It should be apparent to those skilled in the art that the present invention may be embodied in many other specific forms without departing from the spirit or scope of the invention. More particularly, the present invention may be embodied as described below.

In the preferred and illustrated embodiment, the stability of the forklift is classified into three states in accordance with the state of the carried load to determine the limit value $Y_X$. However, the stability of the forklift may be classified into more than three states. In such case, the limit value $Y_X$ is set at a further optimal value and becomes smaller for lower stability states. Thus, pivoting of the rear axle 17 is continued unless the stability of the forklift decreases. This maintains sufficient driving performance of the forklift and prevents instability of the forklift.

In the preferred and illustrated embodiment, the state of the carried load may be detected and judged as a continuously varying parameter. In such case, a map is used to obtain the limit value $Y_X$ in accordance with the continuously varying parameter. For example, the weight W of the load and the vertical position H of the load may be detected continuously. Pivoting of the rear axle 17 is restricted at a limit value $Y_X$ obtained from map. This would maintain the driving performance of the vehicle and prevent a decrease in the stability of the vehicle in a more fine manner.

The state of the carried load may be judged from just either the weight W or the vertical position H. This would simplify the setting of the limits and the load state detection.

In addition to the weight W and the vertical position H of the load, the state of the carried load may be judged from the inclined angle of the forklift mast. Since the rear axle of a forklift is pivotal, the vehicle would have higher lateral stability if the mast is inclined toward the front in comparison to when the mast is inclined toward the rear. In such case, the stability is first determined in accordance with the weight W and vertical position H and then corrected such that stability becomes higher as the mast inclines more to the front when determining the limit value $Y_X$. This achieves both high driving performance and high stability of the vehicle in a more fine manner.

The yaw rate ω need not be detected by the yaw rate sensor 9. For example, the yaw rate ω may be obtained from the turning radius, which is computed by the steered angle detected by a potentiometer or the like, and the vehicle velocity v, which is detected by the velocity sensor 16.

The limit setting device, the load detector, and the pivot restriction controller (microcomputer 33) may be constructed by a logic circuit. This would simplify the structure of the pivot control unit 32.

The attachment of the forklift 1 is not limited to the forks 5a. Other attachments such as a hinged fork, clamps, and rams may be employed instead.

The application of the present invention is not limited to forklifts. The present invention may be applied to other industrial vehicles employing a pivotal axle and having lateral stability that varies when the vehicle changes directions. For example, the present invention may be applied to a shovel loader.

Therefore, the present examples and embodiments are to be considered as illustrative and not restrictive, and the invention is not to be limited to the details given herein, but may be modified within the scope and equivalence of the appended claims.

What is claimed is:

1. A method for controlling pivoting of an axle in an industrial vehicle for carrying and moving a load, wherein the vehicle supports the axle such that the axle is pivotal with respect to a body of the vehicle, pivoting of the axle being temporarily restricted in accordance with the result of comparison between a yaw acceleration of the vehicle and a yaw acceleration limit value, the method comprising the steps of:

classifying a state of the load into a plurality of stability ranges, which are determined according to how the load state affects the stability of the vehicle, wherein the ranges include a relatively high stability range and a relatively low stability range;

setting the yaw acceleration limit value in accordance with a current state of the load, wherein the yaw acceleration limit value is set at a relatively low value when the load state is in the relatively low stability range, and wherein the yaw acceleration limit value is set at a relatively high value when the load state is in the relatively high stability range; and temporarily restricting pivoting of the axle when the yaw acceleration becomes equal to or higher than the yaw acceleration limit value.

2. The method according to claim 1, wherein the load state is determined by at least one of the weight of the load and the vertical position of the load.

3. The method according to claim 1 further comprising the step of restricting pivoting of the axle in accordance with the result of a comparison between a lateral acceleration of the vehicle and a lateral acceleration limit value when the yaw acceleration is lower than the yaw acceleration limit value.

4. The method according to claim 1, wherein the industrial vehicle is a forklift truck.

5. An apparatus for controlling pivoting of an axle in an industrial vehicle for carrying and moving a load, wherein the vehicle supports the axle such that the axle is pivotal with respect to a body of the vehicle, wherein the apparatus comprises:

a yaw acceleration detecting means for detecting a yaw acceleration of the vehicle when the vehicle is turned;

a restricting means for restricting pivoting of the axle in accordance with the yaw acceleration detected by the detecting means;

a setting means for setting a yaw acceleration limit value in accordance with a current load state, wherein possible load states are classified into a plurality of stability ranges according to how the load state affects the stability of the vehicle, the ranges including a relatively high stability range and a relatively low stability range, wherein the yaw acceleration limit value is set at a relatively low value when the load state is in the relatively low stability range, and wherein the yaw acceleration limit value is set at a relatively high value when the load state is in the relatively high stability range;

a load detecting means for detecting the current load state; and a restriction control means for temporarily restricting pivoting of the axle when the yaw acceleration detected by the yaw acceleration detecting means becomes equal to or higher than the yaw acceleration limit value that corresponds to the current load state.

6. The apparatus according to claim 5, wherein the restriction control means further restricts pivoting of the axle in accordance with the result of a comparison between a lateral acceleration of the vehicle and a lateral acceleration limit value when the yaw acceleration is lower than the yaw acceleration limit value.

7. The apparatus according to claim 5, wherein the load detecting means includes at least one of a height detecting means for detecting the vertical position of the load and a weight detecting means for detecting the weight of the load.

8. The apparatus according to claim 5, wherein the setting means, the load detecting means, and the restriction control means are included in a computer.

9. The apparatus according to claim 5, wherein the load detecting means detects the load state as a continuously varying parameter, and wherein the setting means sets the yaw acceleration limit value in accordance with the continuously varying parameter.

10. The apparatus according to claim 5, wherein the industrial vehicle includes a forklift.

11. The apparatus according to claim 5, wherein the yaw acceleration detecting means includes a yaw rate sensor and a computer.

12. The apparatus according to claim 5, wherein the restricting means includes a hydraulic cylinder, an electromagnetic solenoid, and an accumulator.

13. The apparatus according to claim 5, wherein the industrial vehicle includes a forklift.

14. An apparatus for controlling pivoting of an axle in an industrial vehicle for carrying and moving a load, wherein the vehicle supports the axle such that the axle is pivotal with respect to a body of the vehicle, wherein the apparatus comprises:

a yaw acceleration detector for detecting a yaw acceleration of the vehicle when the vehicle is turned;

a pivot restricting mechanism for restricting pivoting of the axle in accordance with the detected yaw acceleration;

a setting device for setting a yaw acceleration limit value in accordance with a current state of the load, wherein possible load states are classified into a plurality of stability ranges according to how the load state affects the stability of the vehicle, the ranges including a relatively high stability range and a relatively low stability range, wherein the yaw acceleration limit value is set at a relatively low value when the load state is in the relatively low stability range, and wherein the yaw acceleration limit value is set at a relatively high value when the load state is in the relatively high stability range;

a load detector for detecting the load state; and a restriction controller for temporarily restricting pivoting of the axle when the yaw acceleration detected by the yaw acceleration detector becomes equal to or higher than the set yaw acceleration limit value, wherein the restriction controller further restricts pivoting of the axle in accordance with the result of a comparison between a lateral acceleration of the vehicle and a lateral acceleration limit value when the yaw acceleration is lower than the yaw acceleration limit value.

15. The apparatus according to claim 14, wherein the load detector includes at least one of a height detector for detecting the vertical position of the load and a weight detector for detecting the weight of the load.

16. The apparatus according to claim 14, wherein the setting device, the load detector, and the restriction controller are included in a computer.

17. The apparatus according to claim 14, wherein the load detector detects the load state as a continuously varying parameter, and wherein the setting device sets the yaw acceleration limit value in accordance with the continuously varying parameter.

18. The apparatus according to claim 14, wherein the yaw acceleration detector includes a yaw rate sensor and a computer.

19. The apparatus according to claim 14, wherein the yaw acceleration detector includes a velocity sensor for detecting the vehicle velocity, a steering angle sensor for detecting the steered angle of a vehicle steering wheel, a yaw rate calculator for calculating the turning radius of the vehicle from the steered angle and for calculating the yaw rate from the vehicle velocity and the turning radius, and a computer.

20. The apparatus according to claim 14, wherein the pivot restricting mechanism includes a hydraulic cylinder, an electromagnetic solenoid, and an accumulator.

* * * * *

UNITED STATES PATENT AND TRADEMARK OFFICE
CERTIFICATE OF CORRECTION

PATENT NO. : 6,175,796 B1
DATED : January 16, 2001
INVENTOR(S) : Kazuo Ishikawa

It is certified that error appears in the above-identified patent and that said Letters Patent is hereby corrected as shown below:

Column 7,
Line 31, please change "range y, which" to -- range $\gamma$, which --;

Column 10,
Lines 25-26, please change "is less than limit" to -- is less than the limit --.

Signed and Sealed this

Eighth Day of October, 2002

Attest:

Attesting Officer

JAMES E. ROGAN
Director of the United States Patent and Trademark Office